(No Model.) 2 Sheets—Sheet 1.
G. B. ST. JOHN.
GEAR CONNECTION FOR VEHICLES.

No. 422,992. Patented Mar. 11, 1890.

(No Model.) 2 Sheets—Sheet 2.

G. B. ST. JOHN.
GEAR CONNECTION FOR VEHICLES.

No. 422,992. Patented Mar. 11, 1890.

Attest.
H. B. Hawley.
S. W. Brainerd.

Inventor.
Garland B. St. John,
By J. M. St. John,
Atty

UNITED STATES PATENT OFFICE.

GARLAND B. ST. JOHN, OF KALAMAZOO, MICHIGAN.

GEAR-CONNECTION FOR VEHICLES.

SPECIFICATION forming part of Letters Patent No. 422,992, dated March 11, 1890.

Application filed September 7, 1889. Serial No. 323,280. (No model.)

*To all whom it may concern:*

Be it known that I, GARLAND B. ST. JOHN, a citizen of the United States, residing at Kalamazoo, in the county of Kalamazoo and State of Michigan, have invented certain new and useful Improvements in Front and Rear Gear-Connections for Vehicles; and I do hereby declare the following to be a full, clear, and exact description of the invention, such as will enable others skilled in the art to which it appertains to make and use the same.

This invention relates to the pivotal connection of the front and rear running-gear of vehicles, commonly known as the "fifth-wheel;" and the object of the invention is to so improve the connection of these parts as to avoid the rapid wear of circles, bolster-plates, and center-bolts in wagons, sleighs, and other vehicles.

The invention consists in the construction, combination, and arrangement of parts, as hereinafter fully set forth and claimed.

Figure 1:
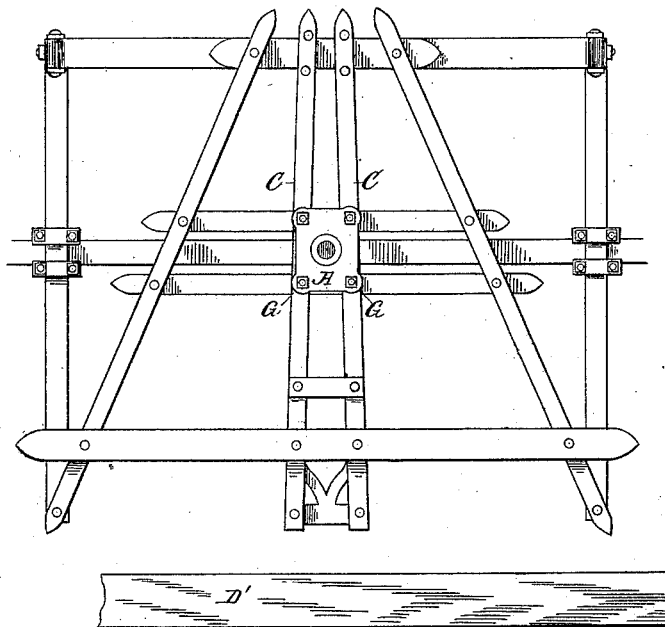
Figure 2:
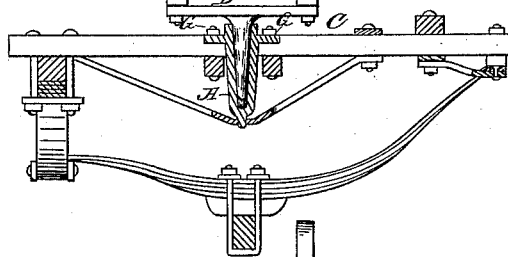
Figure 3:
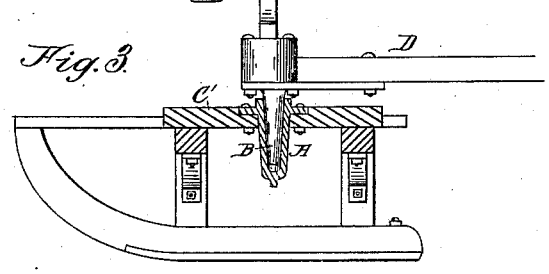
Figure 4:
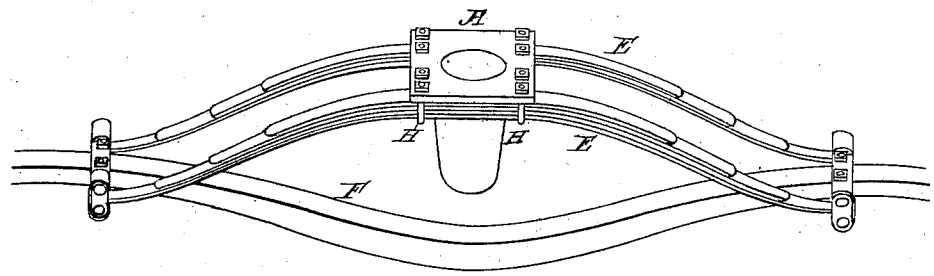

In the accompanying drawings, forming a part of this specification, Figure 1 is a plan view of a device embodying a part of my invention as applied to the frame of platform-spring running-gear; Fig. 2, a central longitudinal section of the same with a partial elevation of the buggy-body and connected parts; Fig. 3, a similar view of the device as applied to a bob-sleigh; Fig. 4, Sheet 2, a view in perspective showing the lower half of the coupling as applied to a modified form of spring connected with the forward axle; and Figs. 5 and 6 the same as applied to other modified forms of axles.

Similar letters of reference indicate corresponding parts.

A common difficulty met with in the operation of the ordinary fifth-wheel of vehicles is the wear of the same. This is due not only to the friction of the parts themselves, but to the accumulation of dust between them, the collection of which is rather aided than otherwise by the presence of the oil used for the lubrication of the parts. Naturally the oil serves to retain the grit, and in combination therewith forms a composition which tends to rapidly cut and grind the parts. To remove, as far as practicable, this objection to the common fifth-wheel, I provide the vehicle with an improved device, which will now be described.

Referring to the drawings, A is a casting having a conical chilled socket and provided with suitable flanges, whereby it is attached to the bars C C of the running-gear by suitable bolts G G. This socket, as will be seen, is closed at the bottom, so as to hold oil. To the reach D or body D', as the case may be, is similarly attached a conical plug or pivot-pin B, which is adapted to fit in the socket part already described. To secure the requisite strength in this pivot-pin, it should be made of wrought-iron or steel. By reference to the drawings it will be seen that the flange connected with this pivot-pin extends over the top of the socket, and thus serves to protect it from falling dust. Further, the surface of the pin, which is exposed to the dust, is comparatively small, and fitting snugly into the upper portion of the socket tends to prevent any dust from entering it at that point. The socket being now supplied with a quantity of oil the parts are self-lubricating, the amount of oil in the socket being sufficient for several weeks without attention. Thus constructed the device affords a very simple and inexpensive coupling for the front and rear running-gear of vehicles, and in addition to its superior wearing qualities, as already specified, possesses the advantage of uncoupling in case of the overturning of the vehicle. The danger incident to such accidents is thereby greatly reduced, since the team, in case of a runaway, is attached only to the front running-gear.

In Fig. 3 is shown an application of the device to the front bob of a bob-sleigh, the socket A being attached to the ordinary cross-bar C'.

In Fig. 4 the socket is shown attached by suitable clips H H to springs E E, suitably mounted on an axle F, which is curved downwardly in the middle to allow for the necessary vertical movement of the socket.

Figure 5:
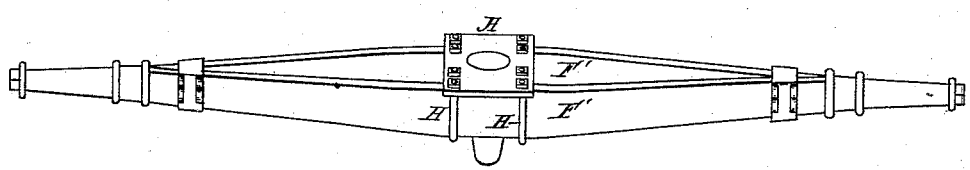

Still another modification is shown in Fig. 5, wherein the socket is similarly clipped to the side pieces F' F' of an axle composed of two parts, converging at the ends and connected by suitable clips and skeins. This construction combines in a high degree the elements of lightness and strength, the parts being trussed together, and there being no holes bored in them to weaken them.

Figure 6:
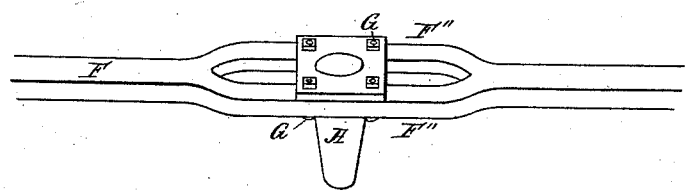

In Fig. 6 the socket is shown attached to the separated portions F'' F'' of an iron axle F, in which case the usual bolts G G may be used.

Having thus described my invention, what I claim as new, and desire to secure by Letters Patent, is—

1. The combination of a conical socket closed at the bottom for the front running-gear of vehicles and a corresponding conical pivot-pin secured to the rear gear, substantially as described, whereby the socket is adapted to hold oil for the continuous lubrication of the parts, and the front and rear gear are adapted to separate in the event of overturning.

2. The combination of the herein-described socket A, pivot-pin B, and the forward axle having an aperture through the middle to receive said socket, substantially as and for the purpose set forth.

3. The combination of the socket A, pivot-pin B, and an axle composed of side pieces F'' F'', separated in the middle to admit the socket and connected at the end by clips and skeins, substantially as described.

In testimony whereof I affix my signature in presence of two witnesses.

GARLAND B. ST. JOHN.

Witnesses:
L. A. KNOWLTON,
A. KNOWLTON.